United States Patent
Shinozaki (10) Patent No.: US 6,505,033 B1
(45) Date of Patent: Jan. 7, 2003

(54) RADIO COMMUNICATION DEVICE WITH MEMORY INFORMATION COINCIDENCE DETECTION AND INFORMATION TRANSFER

(75) Inventor: Yutaka Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1234 days.

(21) Appl. No.: 08/946,851

(22) Filed: Oct. 8, 1997

Related U.S. Application Data (63) Continuation of application No. 08/611,520, filed on Mar. 6, 1996, now abandoned, which is a continuation of application No. 08/213,503, filed on Mar. 16, 1994, now abandoned.

(30) Foreign Application Priority Data

Mar. 18, 1993 (JP) .............................................. 5-058458

(51) Int. Cl.$^7$ ................................................. H04B 1/38
(52) U.S. Cl. .......................... 455/68; 455/558; 455/575
(58) Field of Search .......................... 455/11, 418, 419, 455/420, 517, 73, 88, 550, 551, 557, 558, 566, 575, 90, 68, 70, 74, 186.1

(56) References Cited

U.S. PATENT DOCUMENTS

| | | | | |
|---|---|---|---|---|
| 4,593,155 A | * | 6/1986 | Hawkins ...................... | 455/89 |
| 4,811,377 A | * | 3/1989 | Krolopp et al. ................ | 379/58 |
| 5,029,233 A | * | 7/1991 | Metroka et al. ........... | 455/11.1 |
| 5,249,302 A | * | 9/1993 | Metroka et al. .............. | 455/74 |
| 5,404,580 A | * | 4/1995 | Simpson et al. .............. | 455/89 |
| 5,423,079 A | * | 6/1995 | Namiki et al. ................ | 455/89 |

FOREIGN PATENT DOCUMENTS

JP 3-99532 * 4/1991 .................. 379/62

* cited by examiner

Primary Examiner—Thanh Cong Le
(74) Attorney, Agent, or Firm—Staas & Halsey LLP

(57) ABSTRACT

A communications device includes a first memory for storing parameter information which defines an operation of the communications device, and a second memory for storing parameter information which defines the operation of the communications device. The parameter information stored in the first memory coincides with that stored in the second memory when a communication can take place. A control unit determines whether or not the parameter information stored in the first memory coincides with that stored in the second memory and allows a transmission operation of the communications device based on the parameter information when it is determined that the parameter information stored in the first memory coincides with that stored in the second memory.

12 Claims, 9 Drawing Sheets

| ITEM NO. | PARAMETER |
|---|---|
| 1 | PRM1 |
| 2 | PRM2 |
| 3 | PRM3 |
| ⋮ | ⋮ |
| n | PRMn |

TBL

FIG.7B

| ITEM NO. |
|---|
| 1 |
| 2 |
| 3 |
| ⋮ |
| n |

RADIO COMMUNICATION DEVICE WITH MEMORY INFORMATION COINCIDENCE DETECTION AND INFORMATION TRANSFER

This application is a continuation, of application Ser. No. 08/611,520, filed on Mar. 6, 1996, now abandoned, which is a continuation of application Ser. No. 08/213,503, filed on Mar 16, 1994, now abandoned.

BACKGROUND OF THE INVENTION

1. Field of the Invention

The present invention generally relates to communications devices, and more particularly to a radio communications device capable of varying a transmission frequency and/or a transmission power level.

2. Description of the Related Art

A radio communications device has been practically used in which operation parameters such as the transmission frequency and the transmission power level can be varied. Conventionally, switches for setting variable parameters are attached to the panels of transmitters and receivers. A controller having the setting function, such as a central processing unit (CPU), has also been employed. Use of switches for parameter setting makes it possible for the operator to see and confirm the actual setting of a desired parameter. However, spaces for providing such switches are needed on the transmitters and receivers. This prevents down-sizing. If the controller is used together with switches for setting, the same problems as described above will take place.

An improved controller cooperating with an EEPROM (Electrically Erasable and Programmable Read Only Memory) has been proposed. The desired parameter values are written into the EEPROM, and the controller reads the parameter values therefrom. Use of the EEPROM does not need switches for setting. However, the operator cannot directly confirm the parameter values stored in the EEPROM. With the above in mind, conventionally, the controller executes an initial program, which reads the parameter values from the EEPROM and displays these values on a display unit at the time of power on. The operator sees the parameter values on the display and determines whether or not the parameter values have been correctly set.

If a fault has occurred in a radio communications device, a prompt response is required. For example, a spare unit is substituted for the defective unit in the radio communications device. At this time, it is necessary to set, again, the same desired parameter values as those used before a fault occurs after the substituting operation is completed. As has been described previously, the parameter values are, for example, the transmission frequency and the transmission power level. If a large number of items should be set, an erroneous setting operation may be performed in practice. Hence, it is necessary to perform a check process in order to prevent communications from taking place with an erroneously set parameter value. This increases the load of the operator and prevents quick recovery work.

Hence, it is required that the parameter setting in a radio communications device operating on the variable parameters such as the variable transmission frequency and the transmission power level can be correctly carried out and that transmission can be automatically inhibited if an erroneous parameter is set. Particularly, when a defective unit is replaced by a new one, the parameter setting should be quickly and easily performed.

SUMMARY OF THE INVENTION

It is an object of the present invention to provide a communications device which meets the above requirements.

A more specific object of the present invention is to provide a communications device having the function of automatically detecting erroneous setting and automatically inhibiting transmission when erroneous setting is detected, and having a simplified setting operation.

The above objects of the present invention are achieved by a communications device comprising a first memory unit storing parameter information which defines an operation of the communications device, a second memory unit storing parameter information which defines the operation of the communications device, the parameter information stored in the first memory unit coinciding with that stored in the second memory means when a communication can take place, and a control unit, operatively coupled to the first memory unit and the second memory unit, for determining whether or not the parameter information stored in the first memory unit coincides with that stored in the second memory unit and allowing a transmission operation of the communications device based on the parameter information when it is determined that the parameter information stored in the first memory unit coincides with that stored in the second memory unit.

BRIEF DESCRIPTION OF THE DRAWINGS

Other objects, features and advantages of the present invention will become more apparent from the following detailed description when read in conjunction with the accompanying drawings, in which:

FIG. 3 is a sequence chart of a transmission control operation of the radio communications device shown in FIG. 1A performed at the time of power on;

DESCRIPTION OF THE PREFERRED EMBODIMENTS

Figure 1A:
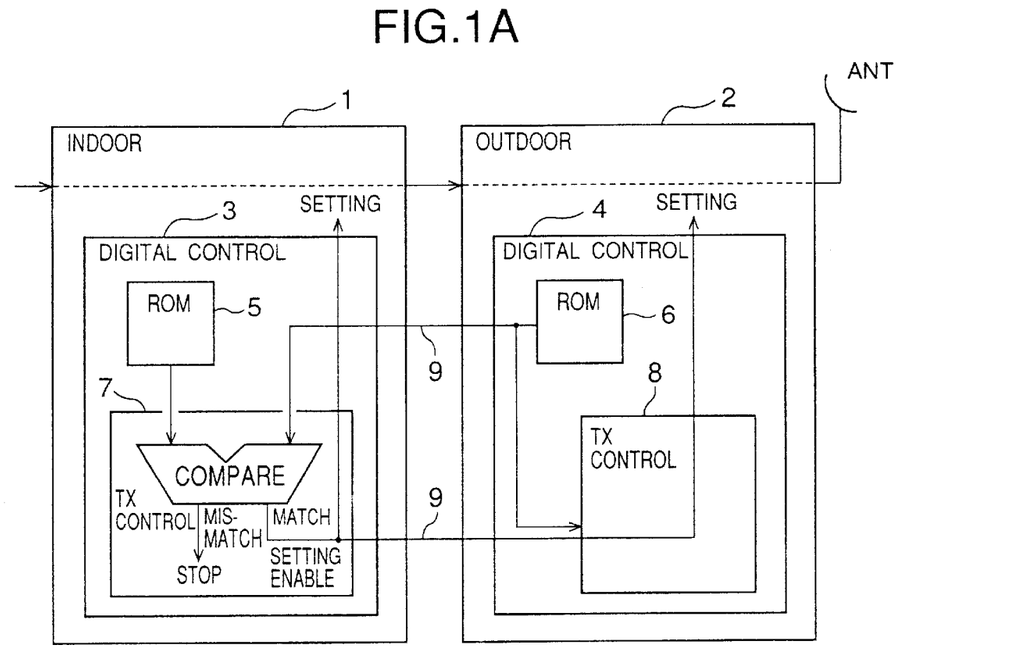
FIG. 1A is a block diagram of an overview of a radio communications device according to a first embodiment of the present invention.

FIG. 1A is a block diagram of an overview of a first embodiment of the present invention. A radio communications device according to the first embodiment of the present invention includes a first unit 1 and a second unit 2, which are, for example, an indoor unit and an outdoor unit, respectively. The indoor unit 1 includes structural parts which form, for example, a configuration between a transmission information processing part and an intermediate frequency (IF) part. The outdoor unit 2 includes structural parts which form, for example, a configuration between another intermediate frequency converting part and a radio frequency amplifying (RF) part connected to an antenna ANT.

More particularly, the indoor unit 1 includes a digital control unit 3, which includes a read only memory (ROM) 5, and a transmission controller 7. The outdoor unit 2 includes a digital control unit 4, which includes a read only memory (ROM) 6, and a transmission controller 8. The digital control unit 3 controls the operation of the overall indoor unit 1. The ROM 5 formed with, for example, an EEPROM, stores operation parameters such as the transmission frequency and the transmission power level. The transmission control unit 7 has the function of setting the desired values of the predetermined parameters.

More particularly, the transmission control unit 7 compares the contents of the ROM 5 with the contents of the ROM 6 in the outdoor device 2. The transmission control unit 7 reads the contents of the ROM 6 via one of two commutations paths 9. When the contents of the ROM 5 coincide with those of the ROM 6, the transmission control unit 7 performs an operation control based on the parameter values stored in the ROM 5. The unit 7 outputs data indicating the parameter values to the relevant structural parts (not shown) of the indoor unit 1, and outputs the above data to the relevant structural parts (not shown) of the outdoor unit 1 via the communications path 9 and the transmission control unit 8. Alternatively, the transmission control unit 8 receives an instruction signal indicating that the contents of the ROM 5 coincide with those of the ROM 6, and reads data indicating the parameter values from the ROM 6. Then, the transmission control unit 6 sends the read data to the relevant structural parts of the outdoor unit 2.

If the contents of the ROM 5 do not coincide with those of the ROM 6, the transmission control unit 7 does not set the parameter values nor initiate the transmission operation. That is, the parameter values are not output to the relevant structural parts of the indoor unit 1 and the outdoor unit 2.

The contents of the ROM5 coincide with those of the ROM 6 in the normal operation. If a fault has occurred in a digital controller 3 and the controller 3 is replaced by a new one, the new transmission control unit 7 compares the contents of the ROM 5 with those of the ROM 6. When the contents of the ROM 5 coincide with those of the ROM6, the indoor unit 1 can operate in the same manner as previously. If the contents of the ROM 5 do not coincide with those of the ROM 6, the indoor unit 1 cannot start the transmission operation.

Figure 1B:
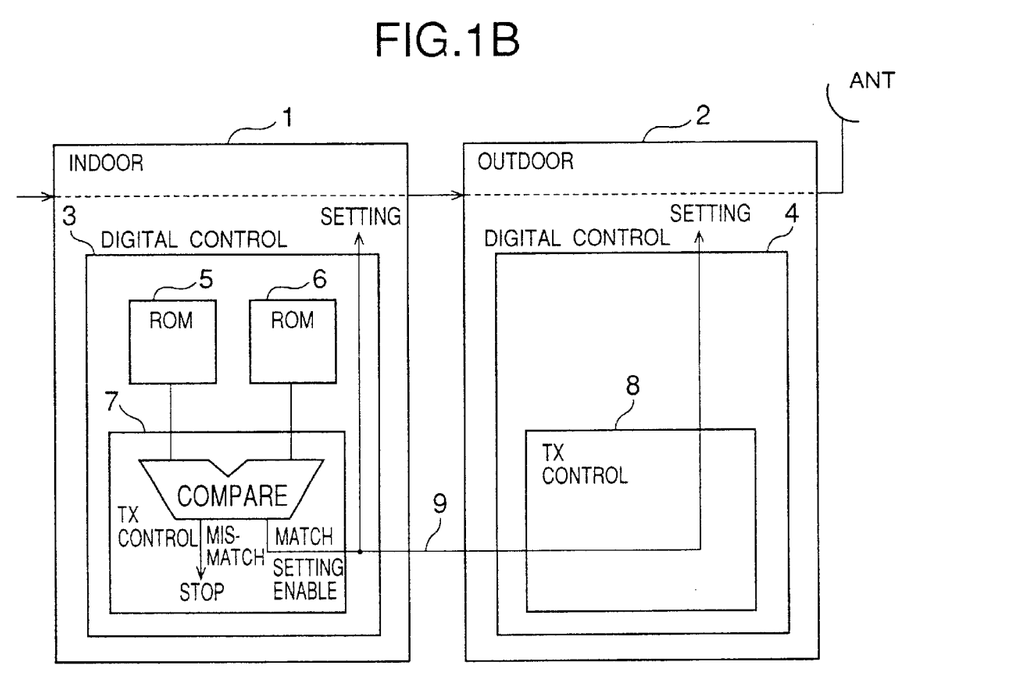
FIG. 1B is a block diagram of an overview of a radio communications device according to a second embodiment of the present invention.

FIG. 1B shows an overview of a radio communications device according to a second embodiment of the present invention. The radio communications device shown in FIG. 1B includes the indoor unit 1 and the outdoor unit 2, but the internal structures of these units differ from those of the units 1 and 2 shown in FIG. 1A. More particularly, the indoor unit 1 includes the ROM 6 provided in the digital control unit 3. It is to be noted that the ROM 6 is provided in the outdoor unit 2 in the configuration shown in FIG. 1A. The digital control unit 4 of the outdoor unit 2 shown in FIG. 1B does not have the ROM 6.

The operation of the radio communications device shown in FIG. 1B is almost the same as that of the radio communications device shown in FIG. 1A. That is, the transmission control unit 7 compares the contents of the ROM 5 with the contents of the ROM 6 both provided in the indoor device 1. The transmission control unit 7 reads the contents of the ROM 6. When the contents of the ROM 5 coincide with those of the ROM 6, the transmission control unit 7 performs an operation control based on the parameter values stored in the ROM 5. The unit 7 outputs data indicating the parameter values to the relevant structural parts (not shown) of the indoor unit 1, and outputs the above data to the relevant structural parts (not shown) of the outdoor unit 1 via the communications path 9 and the transmission control unit 8.

If the contents of the ROM 5 do not coincide with those of the ROM 6, the transmission control unit 7 does not set the parameter values nor initiate the transmission operation. That is, the parameter values are not output to the relevant structural parts of the indoor unit 1 and the outdoor unit 2.

In practice, the indoor device 1 is made up of a plurality of replaceable cards, boards, units or the like on which relevant circuits are formed. The above holds true for the outdoor device 1. Under the above circumstance, it is required that the ROMs 5 and 6 are mounted on different cards. If a fault has occurred in the card having the ROM 5, this is replaced by a new one. In this case, the contents of the ROM mounted on the new card are compared with the contents of the ROM 6. If the ROM 5 stores the correct parameter values, these values will coincide with those stored in the ROM 6.

In the configurations shown in FIGS. 1A and 1B, it is possible to control the transmission operation based on the contents of the remaining ROM rather than the replaced ROM even if the contents of both the ROMs do not coincide with each other. Further, the ROMs 5 and 6 are formed with programmable ROMs, correct data can be written into the newly provided ROM when the contents of the newly provided ROM do not coincide with those of the remaining ROM.

Figure 2:
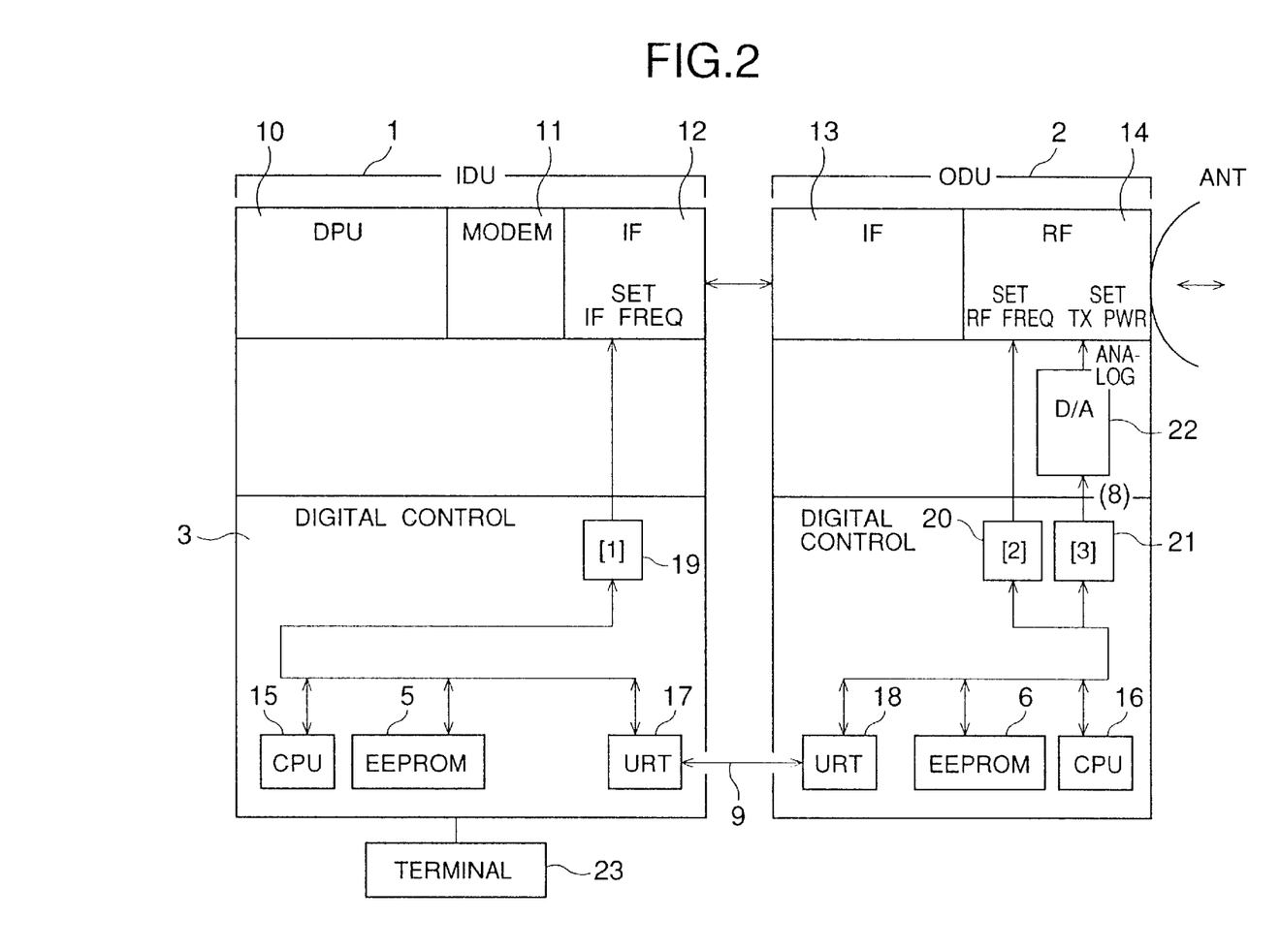
FIG. 2 is a block diagram of the details of the radio communications device shown in FIG. 1A.

FIG. 2 is a block diagram which shows, in more detail, the radio communications device shown in FIG. 1A. In FIG. 2, parts that are the same as those shown in FIG. 1A are given the same reference numerals. The indoor unit 1 labeled IDU includes a multiplexer/demultiplexer unit (DPU) 10, a modem unit (MODEM) 11, and an intermediate frequency conversion unit (IF) 12. The multiplexer/demultiplexer unit 10 multiplexes and demultiplexes transmit and receive data. The modem unit 11 performs a modulation and demodulation operation. The digital control unit 3 includes a CPU 15, a Communications interface circuit (also called a universal receiver/transmitter: URT) 17 and a local oscillator 19 for achieving an intermediate frequency amplifying operation. The CPU 15 controls the operation of the overall digital control unit 3. The interface circuit 17 communicates with the outdoor unit 2 via the communications path 9. The ROM 5 is formed with an EEPROM, and stores the values of the predetermined operation parameters and a control program for defining the operation of the CPU 15. A maintenance person terminal (MPT) 23 is connected to the indoor unit 1.

The outdoor unit 2 labeled ODU includes an intermediate frequency conversion unit (IF) 13 and a radio frequency amplifying unit (RF) 14. The intermediate frequency conversion unit 13 performs an intermediate frequency amplifying operation. The radio frequency unit 14 performs a radio frequency amplifying operation. The digital control unit 4 of the outdoor unit 2 includes a CPU 16, a communications interface circuit (URT) 18, a local oscillator 20 for the radio frequency amplifying operation, and an output controller 21. The ROM 6 is formed with an EEPROM, and stores the value of the predetermined operation parameters and a control program for defining the operation of the CPU 16. A digital-to-analog (D/A) converter 22 is connected between the output controller 21 and the radio frequency amplifying unit 14, and converts a digital control signal from the output controller 21 into an analog signal sent to the radio frequency amplifying unit 14.

Figure 3:
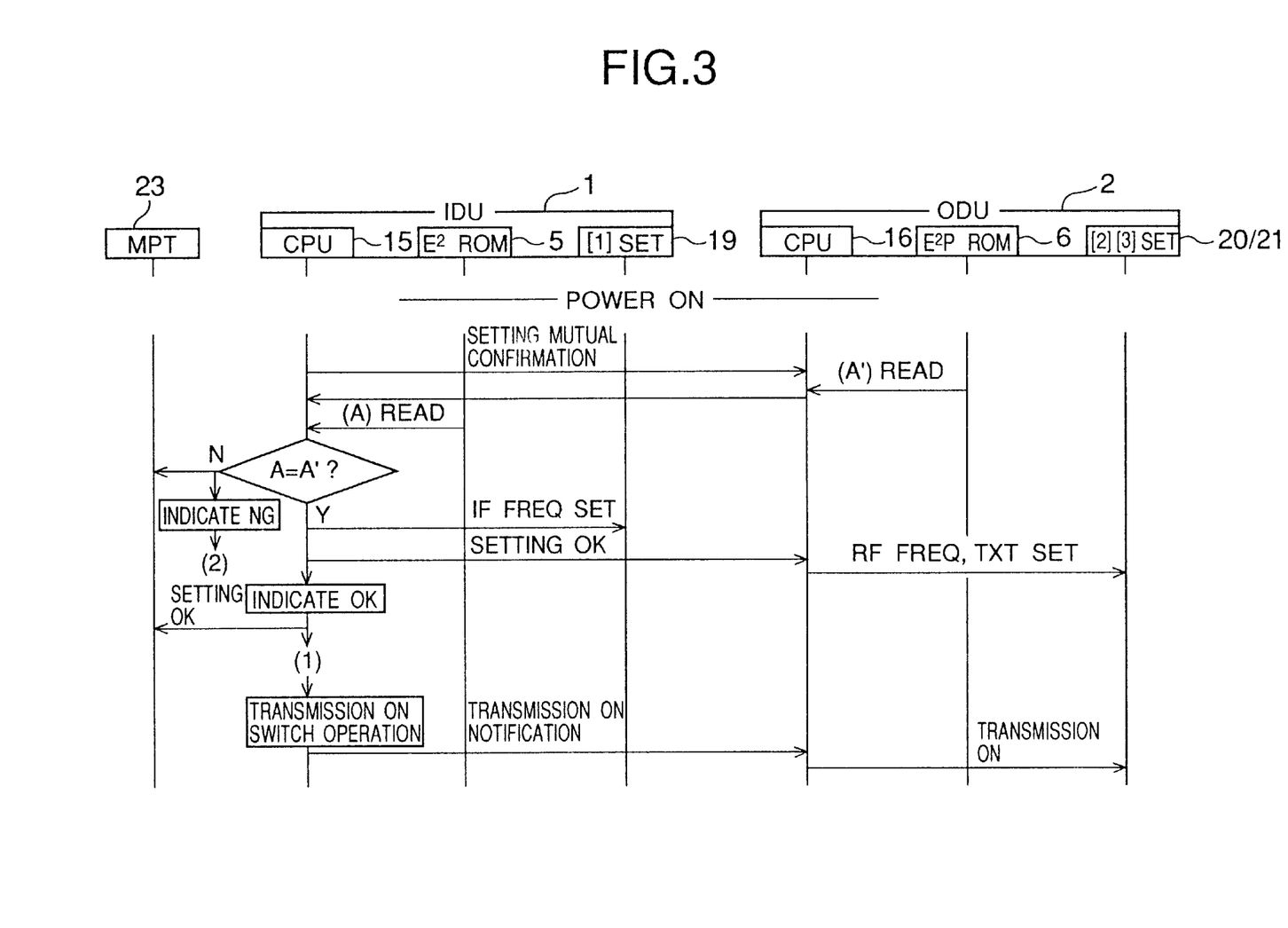

FIG. 3 is a sequence chart of a transmission control sequence performed in the radio communications device shown in FIG. 2 at the time of power on. Some of the essential parts shown in FIG. 2 are illustrated in the upper portion of FIG. 3, and the contents of the operations thereof are depicted below the relevant parts in FIG. 3.

In response to power on caused by turning ON a power switch (not shown for the sake of simplicity), a confirmation operation for setting the operation parameters is mutually carried out between the CPU 15 and the CPU 16. The CPU 16 reads the contents (one or a plurality of operation parameters) A' of the EEPROM 6, and transfers the parameter information A' to the CPU 15. The CPU 15 reads the contents (one or a plurality of operation parameters) A of the EEPROM 5, and compares it with the parameter information A'. If the parameter information A does not coincide with the parameter information A', the CPU 15 informs the maintenance terminal 23 (labeled MPT in FIG. 3) that there is erroneous setting.

When the comparison result shows A=A', the CPU 15 causes the local oscillator 19 for the intermediate frequency amplifying operation to have the relevant intermediate frequency, and informs the CPU 16 that the setting should be initiated. Then the CPU 16 causes the local oscillator 20 to have the relevant radio frequency, and causes the output controller 21 to generate a control signal indicating the relevant transmission power level. Then, the CPU 15 informs the maintenance terminal 23 that the setting has been completed (it is ready to start transmission). In this case, it is possible to display the details of the operation parameters set in the above manner on the maintenance terminal 23 and to request the operator to input an acknowledge signal. When the operator of the maintenance terminal 23 manipulates a relevant switch for instructing start of transmission, a corresponding signal is applied to the CPU 15, which informs the CPU 16 that transmission should be started. Then, the CPU 16 causes the output controller 21 to start the transmission control for controlling the radio frequency amplifying unit 14.

Figure 4:
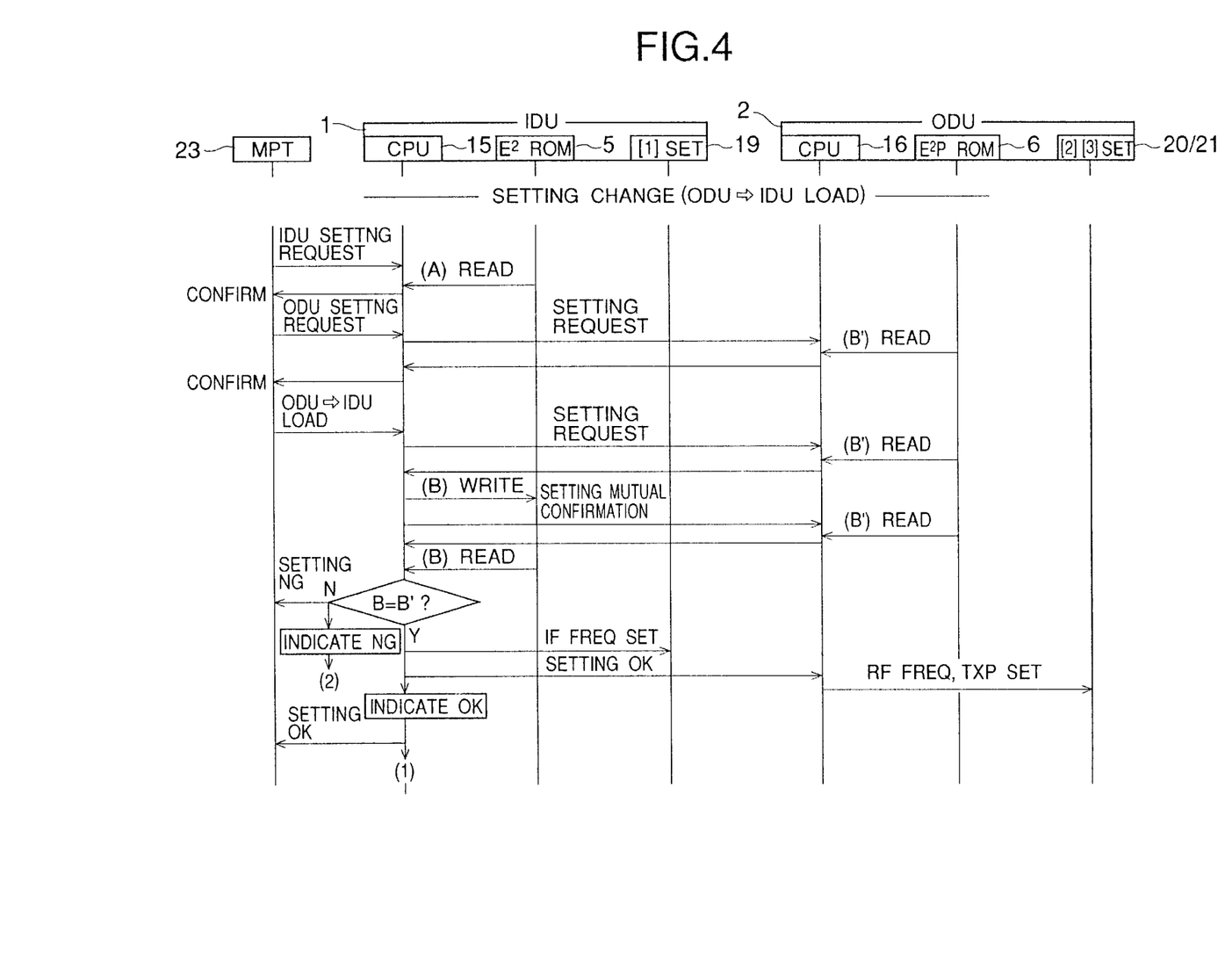
FIG. 4 is a sequence chart of changing the contents of a ROM storing parameter information provided in the radio communications device shown in FIG. 1A.

FIG. 4 is a sequence chart of writing the parameter values of one EEPROM into the other EEPROM. In the sequence shown in FIG. 4, the maintenance terminal 23 sends a request for setting to the indoor unit 1 and the outdoor unit 2, and reads the contents (parameter information A') of the EEPROM 5 and the contents (parameter information B') of the EEPROM 6. Then, the maintenance terminal 23 compares the contents of the EEPROM 5 with the contents of the EEPROM 6. When the contents of the EEPROMs 5 and 6 do not coincide with each other, a loading process is initiated. In the sequence shown in FIG. 4, the parameter information B' of the EEPROM 6 are correct. In this case, the maintenance terminal 23 initiates the loading process in which the parameter information B' stored in the EEPROM 6 is written into the EEPROM 5. In FIG. 4, the parameter information B' written into the EEPROM 5 is indicated as parameter information B.

The following steps of the sequence are the same as those of the sequence shown in FIG. 3. That is, the confirmation operation for setting the operation parameters is mutually carried out between the CPU 15 and the CPU 16. The CPU 16 reads the parameter information B' from the EEPROM 6, and transfers the read parameter information B to the CPU 15. The CPU 15 reads the parameter information B from the EEPROM 5, and compares it with the parameter information B'. If the parameter information B does not coincide with the parameter information B', the CPU 15 informs the maintenance terminal 23 (labeled MPT in FIG. 3) that there is erroneous setting.

When the comparison result shows B=B', the CPU 15 causes the local oscillator 19 for the intermediate frequency amplifying operation to have the relevant intermediate frequency, and informs the CPU 16 that the setting should be initiated. Then the CPU 16 causes the local oscillator 20 to have the relevant radio frequency, and causes the output controller 21 to generate the control signal indicating the relevant transmission power level. Then, the CPU 15 informs the maintenance terminal 23 that the setting has been completed (it is ready to start transmission). In this case, it is possible to display the details of the operation parameters set in the above manner on the maintenance terminal 23 and to request the operator to input the acknowledge signal. When the operator of the maintenance terminal 23 manipulates the relevant switch for instructing start of transmission, the corresponding signal is applied to the CPU 15, which informs the CPU 16 that transmission should be started. Then, the CPU 16 causes the output controller 21 to start the transmission control for controlling the radio frequency amplifying unit 14.

The sequence shown in FIG. 4 is used when a unit is replaced by another new unit that has an EEPROM storing parameter information different with that used before the replacement is performed. In this case, the contents of the EEPROM mounted on the new unit are rewritten by the sequence shown in FIG. 4.

Figure 5:
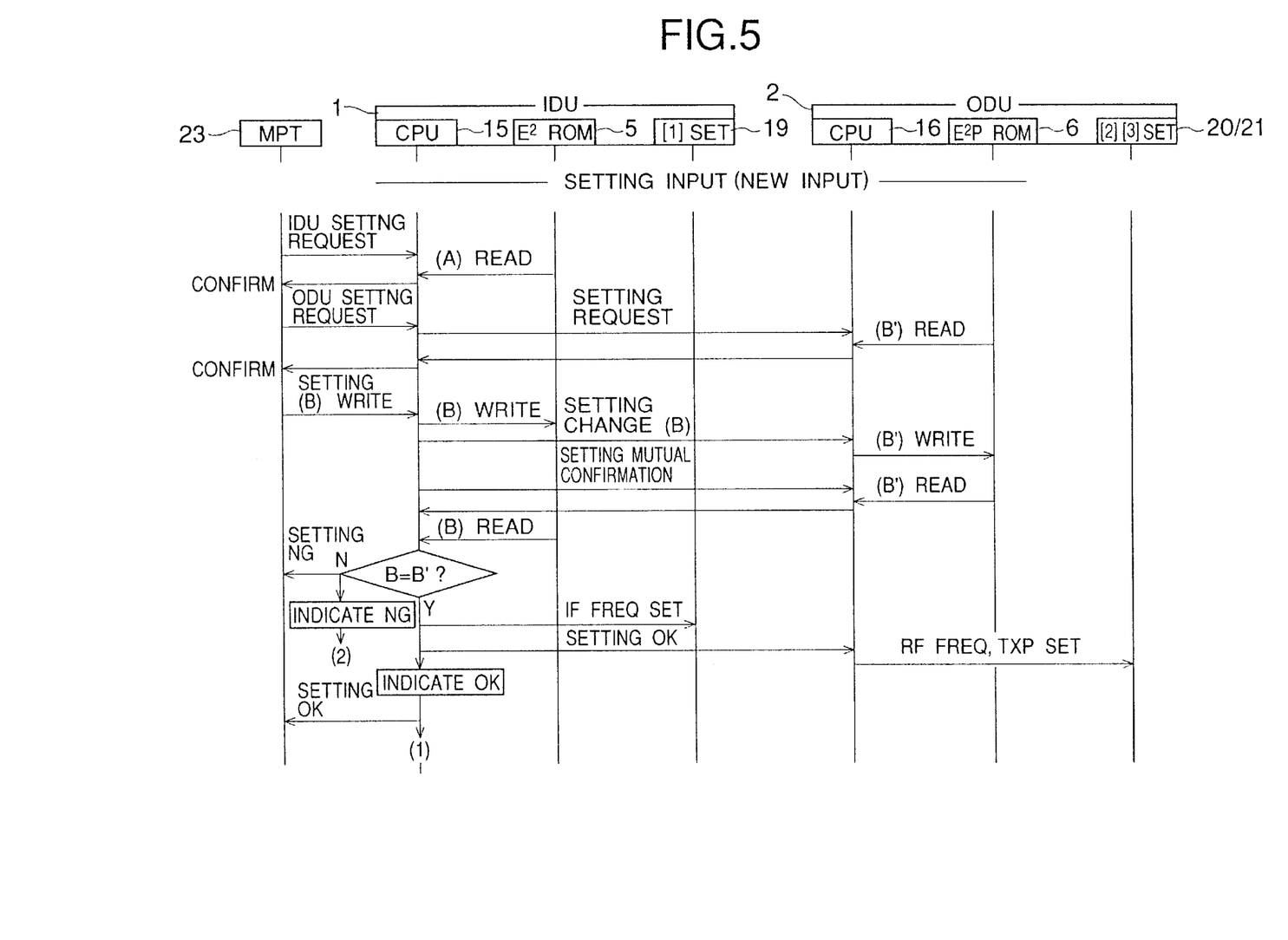
FIG. 5 is a sequence chart of newly writing parameter information into ROMs provided in the radio communications device shown in FIG 1A.

FIG. 5 is a sequence chart of newly writing parameter information into both the EEPROMs 5 and 6. The basic operation of the sequence shown in FIG. 5 is the same as the sequence shown in FIG. 4. In the sequence shown in FIG. 5, the contents of the EEPROMs 5 and 6 are confirmed and new parameter information input by the maintenance terminal 23 is written into the EEPROMs 5 and 6.

Figure 6:
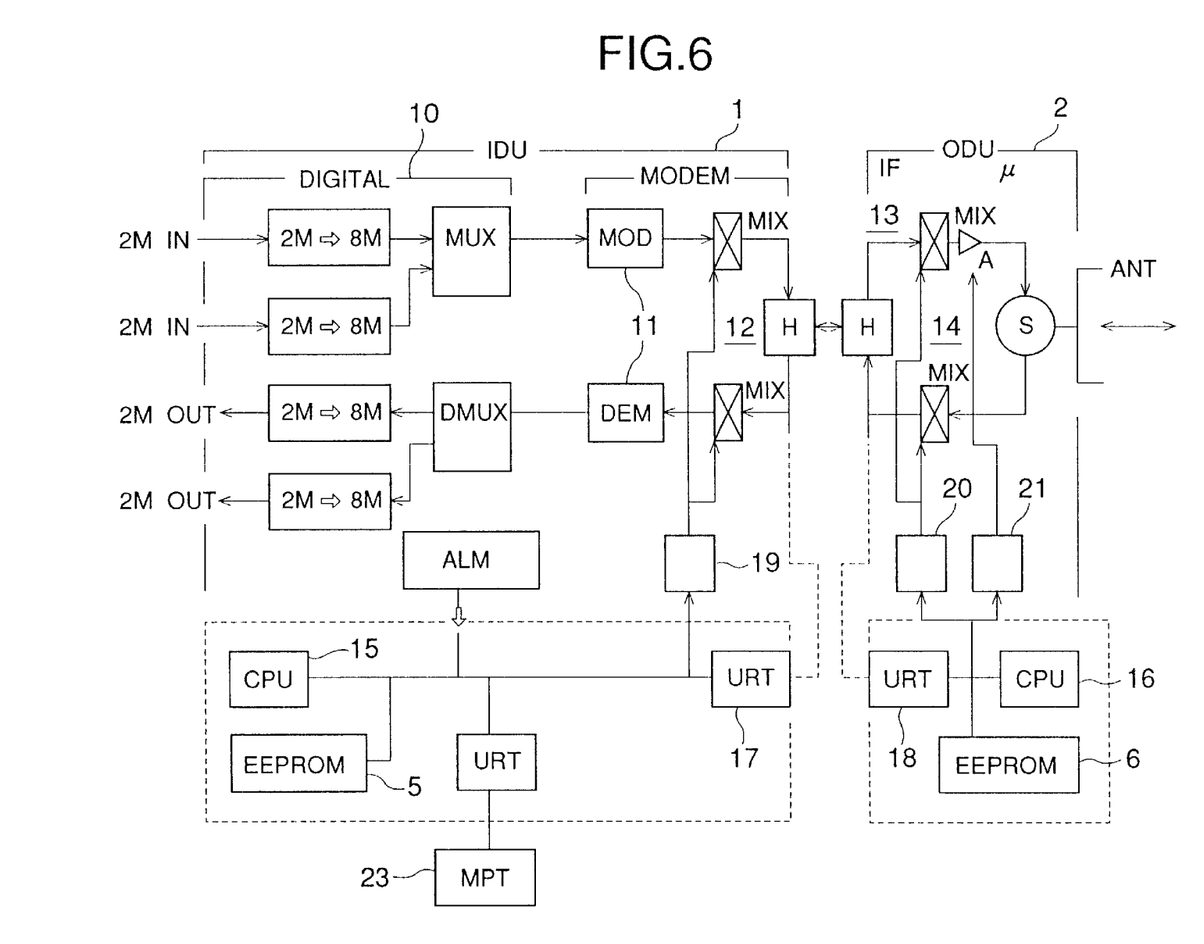
FIG. 6 is a block diagram of the details of the radio communications device shown in FIG. 1A.

FIG. 6 shows the details of the structure shown in FIG. 1A in which the two ROMs are respectively provided in the indoor unit 1 and the outdoor unit 2. In FIG. 6, parts that are the same as those shown in the previously described figures are given the same reference numerals as previously. The radio communications device made up of the indoor unit 1 and the outdoor unit 2 shown in FIG. 6 two 2 Mbps input interfaces and two 2Mbps output interfaces. A microwave radio signal is generated by multiplexing the two interfaces. The indoor unit 1 includes a transmitter system and a receiver system, and the outdoor unit 2 includes a transmitter system and a receiver system.

The indoor unit 1 includes the digital unit 10 and a modem unit MODEM, which unit MODEM includes the modem unit 11 and the intermediate frequency amplifying unit 12 shown in FIG. 2. The digital unit 10 includes two multiplexer (2M→8M) for generating an 8 Mbps signal from 2Mbps input signals, a multiplexer MUX for a multiplexed transmission signal obtained by multiplexing 8 Mbps signals, a demultiplexer for generating 8 Mbps signals from a received multiplexed signal, two demultiplexers (8M→2M) for generating 2 Mbps signals from the 8 Mbps signals. The indoor unit 1 includes an alarm unit ALM for collecting supervisory signals generated by supervising predetermined parts of the indoor unit 1, and sends the collected supervisory signals to the CPU 15. The modem unit MODEM includes a modulator MOD, mixers MIX, a demodulator DEM, and a hybrid circuit H.

In practice, the indoor unit 1 is made up of a plurality of cards or the like inserted into slots in a shell of the indoor unit 1. In the structure shown in FIG. 6, the CPU 15, the EEPROM 5, the interface unit 17, and an interface unit URT for interfacing with the maintenance terminal 23 are mounted on one card, as indicated by a block depicted by a broken line.

The outdoor unit 2 includes the intermediate frequency amplifying unit 13, the radio frequency (microwave: $\mu$) amplifying unit 14 and the digital control unit 4 shown in FIG. 2. The intermediate frequency amplifying unit 13 includes a hybrid circuit H and two mixers MIX. The microwave amplifying unit 14 includes a power amplifier A and an antenna sharing unit S connected to the antenna ANT. In practice, the outdoor unit 2 is made up of a plurality of cards or the like inserted into slots in a shell of the outdoor unit 2. In the structure shown in FIG. 6, the EEPROM 6, the CPU 16 and the interface unit 18 are mounted on one card, as indicated by a block depicted by a broken line.

In the structure shown in FIG. 6, the operation parameters are the intermediate frequency generated by the local oscillator 19, the intermediate frequency generated by the local oscillator 20, and the transmission power level regulated by the power amplifier A. The EEPROMs 5 and 6 store the above operation parameters.

Instead of actually storing the values of the operation parameters, it is possible to employ an alternative structure which uses a table managed by the CPU 15. Such a table is stored in, for example, the CPU 15.

Figure 7A:
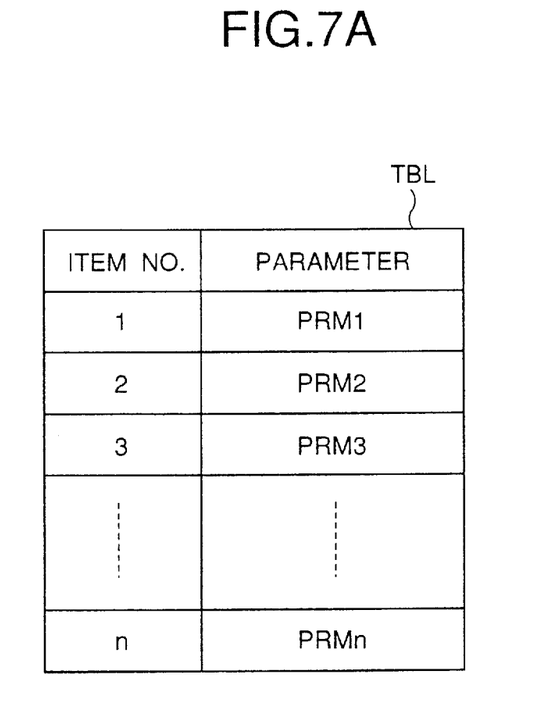
FIGS. 7A and 7B are diagrams showing an alternative structure which can be employed in the first and second embodiments of the present invention.
Figure 7B:
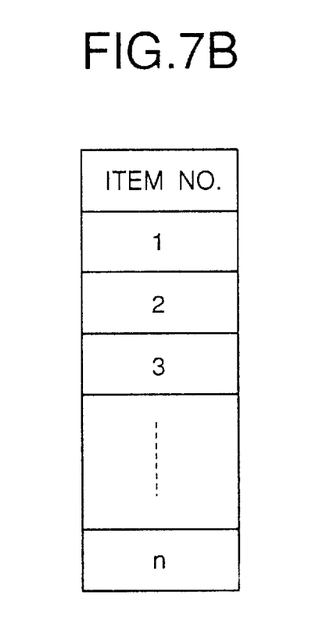

The CPU 15 stores and manages a table TBL shown in FIG. 7A. The table TBL stores item numbers and the values of the relevant operation parameters to be set in the indoor unit 1 and the outdoor unit 2 shown in FIG. 6. When the operation parameters are the intermediate frequency generated by the local oscillator 19, the intermediate frequency generated by the local oscillator 20, and the transmission power level regulated by the power amplifier A, the table TBL stores the values of these operation parameters associated with the item numbers. Each of the EEPROMs 5 and 6 stores the item numbers to be set in the indoor unit 1 and the outdoor unit 2, as shown in FIG. 7B. If the above-mentioned three operation parameters are assigned item numbers 1, 2 and 3, each of the EEPROMs 5 and 6 store the above item numbers 1, 2 and 3.

When the CPU 15 compares the contents of the EEPROMs 5 and 6 with each other, the CPU 15 determines whether or not all the item numbers of the EEPROM 5 completely coincide with those of the EEPROM 6. The above-mentioned alternative can reduce the storage capacity of each of the EEPROMs 5 and 6.

Figure 8:
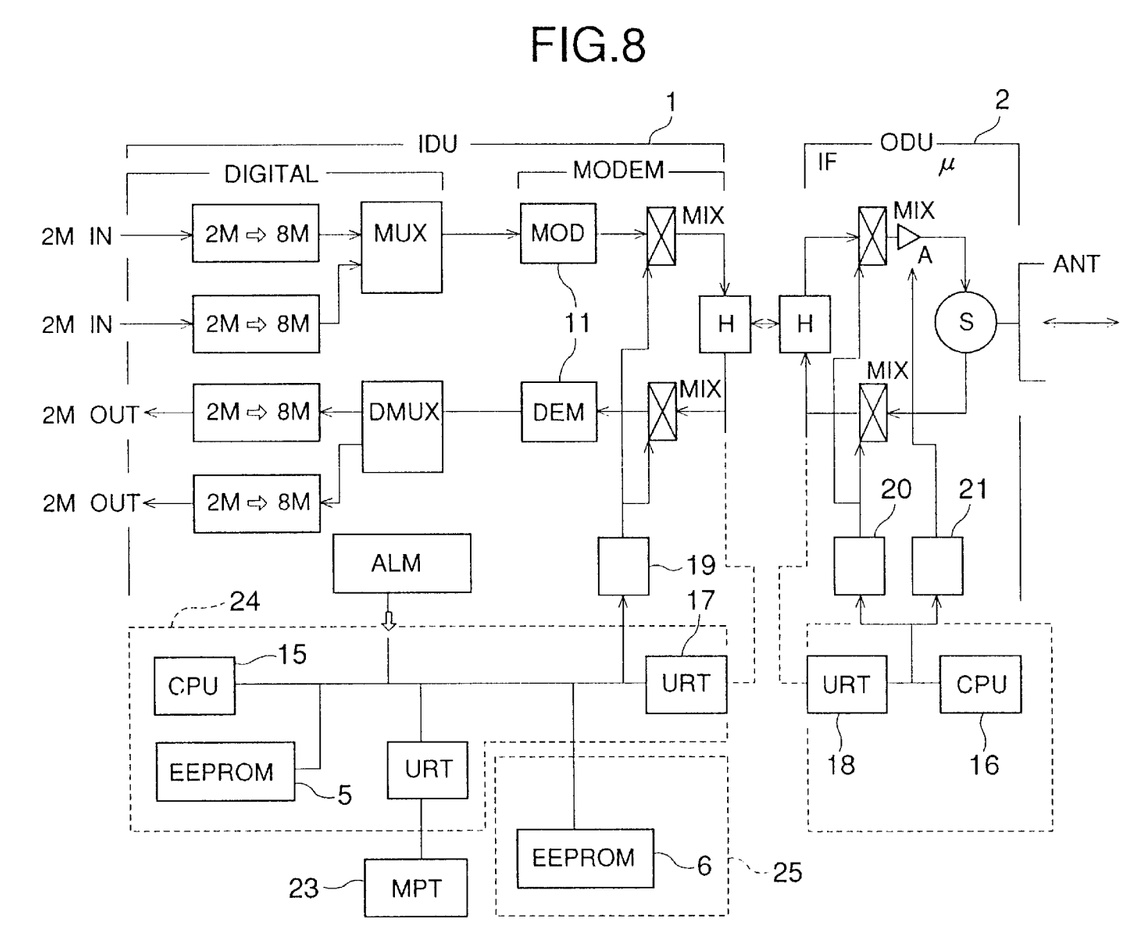
FIG. 8 is a block diagram of the details of the radio communications device show n in FIG. 1B.

FIG. 8 shows the details of the structure shown in FIG. 1B. In FIG. 8, parts that are the same as those shown in the previously described figures are given the same reference numerals. The indoor unit 1 includes a card 25 on which the EEPROM 6, the card 25 being provided separately from a card 24 having the EEPROM 5. The card on which the CPU 16 and the interface unit 18 does not have the EEPROM 6. If a fault has occurred in the card 24, the card 24 is replaced with a new one. Then, the CPU mounted on the new card 24 compares the parameter information stored in the EEPROM 5 mounted thereon with that stored in the EEPROM 6 mounted on the card 25.

Figure 9:
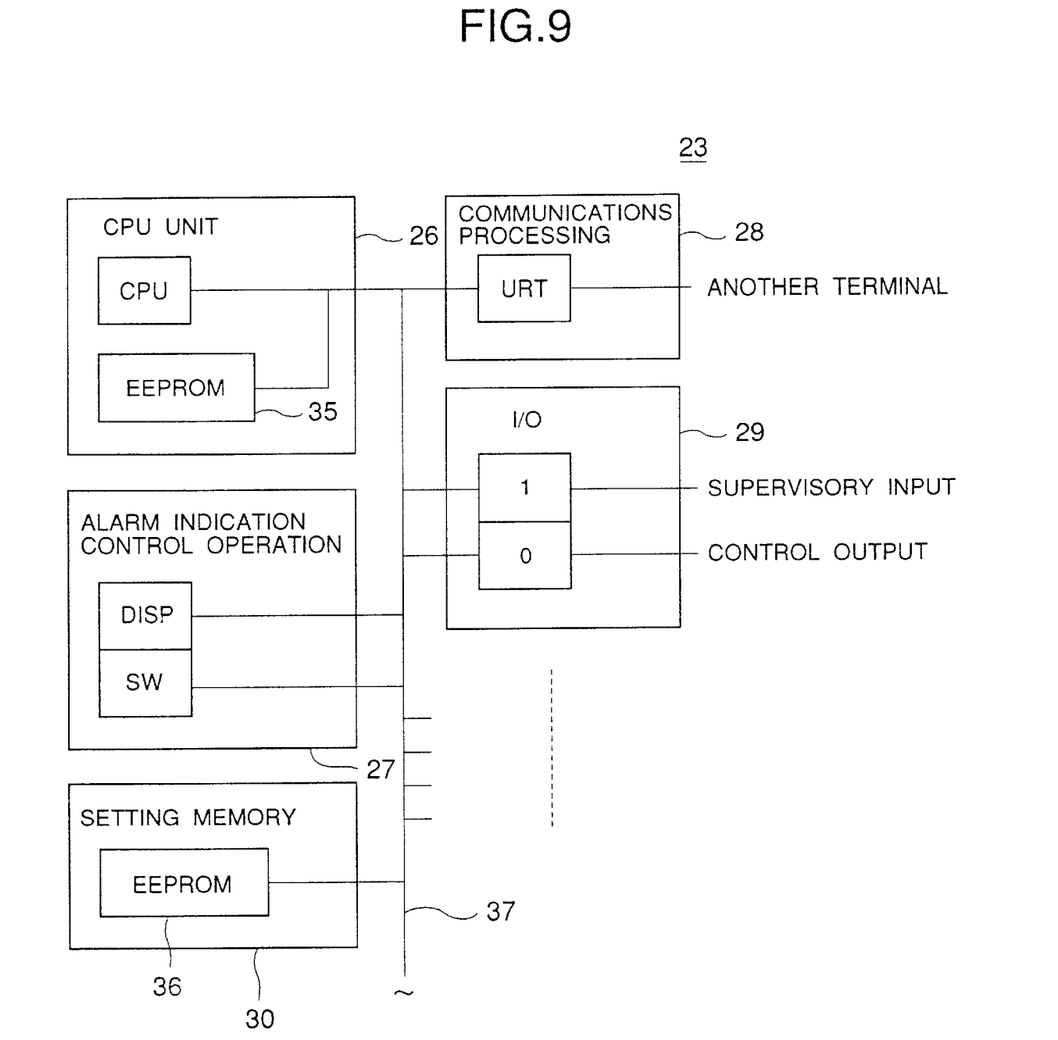
FIG. 9 is a block diagram of the structure of a maintenance terminal used in the first and second embodiments of the present invention.

FIG. 9 is a block diagram of the maintenance terminal 23 used in the previously-described embodiments of the present invention. As shown in FIG. 9, the maintenance terminal 23 includes a CPU unit 26, an alarm indication/control unit 27, a communications processing unit 28, an input/output unit 29 and a memory unit 30. The CPU unit 26 includes a CPU and an EEPROM 35. The alarm indication/control unit 27 includes a display DISP and switches or keys SW. The memory unit 30 includes an EEPROM 36. The communications processing unit 28 includes a universal receiver/transmitter URT. The input/output unit 29 includes an input interface I and an output interface O. The above structural elements are connected together by means of a CPU bus 37. Instructions and data can be input to the maintenance terminal 23 by the unit 27. The maintenance unit 23 shown in FIG. 9 can communicates with another maintenance unit (not shown in FIG. 9). The input interface I of the input/output unit 29 receives the supervisory signals from the alarm unit ALM shown in FIGS. 6 and 8, and the output interface O thereof outputs control signals from the CPU unit 26 to the indoor unit 1.

It will be noted that the EEPROMs 35 and 36 correspond to the aforementioned EEPROMs 5 and 6. When a card or unit having either the EEPROM 35 or EEPROM 36 is replaced by a new one due to a fault or updating of the software version, the contents of the EEPROMs 35 and 36 are compared at the time of power on. Only when the contents of the EEPROMs 35 and 36 coincide with each other, the parameter information is allowed to be set in the relevant parts of the maintenance terminal 23. If the contents of the EEPROMs 35 and 36 do not coincide with each other, a process is performed which makes the EEPROMs 35 and 36 have the same contents. It is possible to write the contents of the remaining EEPROM into the newly provided card or vice versa.

According to the present invention, it is possible to automatically check whether or not the variable parameters are correctly set in a communications device such as a radio communications device and to prevent transmission if an erroneous setting of parameter information is detected, so that reliability of the operation of the communications device is improved. Further, resetting of parameter information to be performed after a unit or card is replaced by a new one can be quickly performed with ease. Furthermore, since parameter information is stored in non-volatile memories, the communications device does not need a larger hardware structure even if a large number of operation parameters is used.

The present invention is not limited to the specifically disclosed embodiments, and variations and modifications may be made without departing from the scope of the present invention.

What is claimed is:

1. A communications device comprising:
  a first replaceable unit comprising first memory means for storing first parameter information which defines an operation of the communications device, said first parameter information comprising a transmission frequency and a transmission power level;
  a second replaceable unit comprising second memory means for storing second parameter information which defines the operation of the communications device, said second parameter information comprising a transmission frequency and a transmission power level;
  a transmit/receive part for transmitting a signal to a communications medium and receiving a signal therefrom; and control means for determining whether the first parameter information stored in the first memory means coincides with the second parameter information stored in the second memory means and for setting the parameter information in the transmit/receive part so that the transmit/receive part is allowed to perform a transmission operation when the first parameter information stored in the first memory means coincides with the second parameter information stored in the second memory means, wherein each of the first memory means and the second memory means are provided by respective chips.

2. The communications device as claimed in claim 1, wherein said control means determines whether the parameter information stored in the first memory means coincides with the parameter information stored in the second memory means one of when a power supply to the communications device is turned on and before a transmission operation of the communications device is initiated.

3. The communications device as claimed in claim 1, wherein the parameter information comprises values of parameters which define the operation of the communications device.

4. The communications device as claimed in claim 1, further comprising:

means for writing parameter information into the first memory means and the second memory means.

5. The communications device as claimed in claim 1, wherein said control means determines whether the parameter information stored in the first memory means coincides with the parameter information stored in the second memory means after one of the first replaceable unit and the second replaceable unit is replaced by a new replaceable unit.

6. The communications device as claimed in claim 1, wherein the first memory means comprises a first programmable read only memory; and the second memory means comprises a second programmable read only memory.

7. A communications device comprising:

a first replaceable part comprising first memory means for storing first parameter information which defines an operation of the communications device, said first parameter information comprising a transmission frequency and a transmission power level;

a second replaceable part comprising second memory means for storing second parameter information which defines the operation of the communications device, said second parameter information comprising a transmission frequency and a transmission power level;

a transmit/receive part for transmitting a signal to a communications medium and receiving a signal therefrom;

control means for determining whether the first parameter information stored in the first memory means coincides with the second parameter information stored in the second memory means and for setting the parameter information in the transmit/receive part so that the transmit/receive part is allowed to perform a transmission operation when the first parameter information stored in the first memory means coincides with the second parameter information stored in the second memory means, wherein each of the first memory means and the second memory means are provided by respective chips, the first replaceable part and the second replaceable part forming the communications device.

8. A communications device comprising:

first memory means for storing parameter information which defines an operation of the communications device;

second memory means for storing parameter information which defines the operation of the communications device;

a transmit/receive part for transmitting a signal to a communications medium and receiving a signal therefrom;

control means for determining whether the parameter information stored in the first memory means coincides with the parameter information stored in the second memory means and for setting the parameter information in the transmit/receive part so that the transmit/receive part is allowed to perform a transmission operation when the parameter information stored in the first memory means coincides with the parameter information stored in the second memory means, wherein each of the first memory means and the second memory means are provided by respective chips;

a first part installed indoors and comprising the first memory means; and a second part installed outdoors and comprising the second memory means, the first part and the second part forming the communications device.

9. A communications device comprising:

first memory means for storing parameter information which defines an operation of the communications device;

second memory means for storing parameter information which defines the operation of the communications device;

a transmit/receive part for transmitting a signal to a communications medium and receiving a signal therefrom;

control means for determining whether the parameter information stored in the first memory means coincides with the parameter information stored in the second memory means and for setting the parameter information in the transmit/receive part so that the transmit/receive part is allowed to perform a transmission operation when the parameter information stored in the first memory means coincides with the parameter information stored in the second memory means, wherein each of the first memory means and the second memory means are provided by respective chips;

a first replaceable unit comprising the first memory means; and a second replaceable unit comprising the second memory means, wherein the first replaceable unit is an indoor unit and the second replaceable unit is an outdoor unit.

10. A communications device comprising:

first memory means for storing parameter information which defines an operation of the communications device;

second memory means for storing parameter information which defines the operation of the communications device;

a transmit/receive part for transmitting a signal to a communications medium and receiving a signal therefrom;

control means for determining whether the parameter information stored in the first memory means coincides with the parameter information stored in the second memory means and for setting the parameter information in the transmit/receive part so that the transmit/receive part is allowed to perform a transmission operation when the parameter information stored in the first memory means coincides with the parameter information stored in the second memory means, wherein each of the first memory means and the second memory means are provided by respective chips; and table means for storing a table which defines, in connection with item numbers, values of parameters which define the operation of the communications device, wherein the first memory means stores item numbers as the parameter information, and the second memory means stores item numbers as the parameter information; and wherein said control means comprises means for determining whether the item numbers stored in the first memory means coincide with the item numbers stored in the second memory means.

11. A communications device comprising:

first memory means for storing parameter information which defines an operation of the communications device;

second memory means for storing parameter information which defines the operation of the communications device;

a transmit/receive part for transmitting a signal to a communications medium and receiving a signal therefrom;

control means for determining whether the parameter information stored in the first memory means coincides with the parameter information stored in the second memory means and for setting the parameter information in the transmit/receive part so that the transmit/receive part is allowed to perform a transmission operation when the parameter information stored in the first memory means coincides with the parameter information stored in the second memory means, wherein each of the first memory means and the second memory means are provided by respective chips; and means for reading the parameter information from one of the first memory means and the second memory means and for writing the read parameter information into other one of the first memory means and the second memory means when the parameter information stored in the first memory means does not coincide with the parameter information stored in the second memory means.

12. A communications device comprising:

first memory means for storing parameter information which defines an operation of the communications device;

second memory means for storing parameter information which defines the operation of the communications device;

a transmit/receive part for transmitting a signal to a communications medium and receiving a signal therefrom; and control means for determining whether the parameter information stored in the first memory means coincides with the parameter information stored in the second memory means and for setting the parameter information in the transmit/receive part so that the transmit/receive part is allowed to perform a transmission operation when the parameter information stored in the first memory means coincides with the parameter information stored in the second memory means, wherein each of the first memory means and the second memory means are provided by respective chips, wherein the communications device is a radio communications device; and the parameter information comprises a transmission frequency, a transmission power level and an intermediate frequency.

* * * * *